3,462,233
FUEL BURNER CONTROL UTILIZING SILICON CONTROLLED RECTIFIER

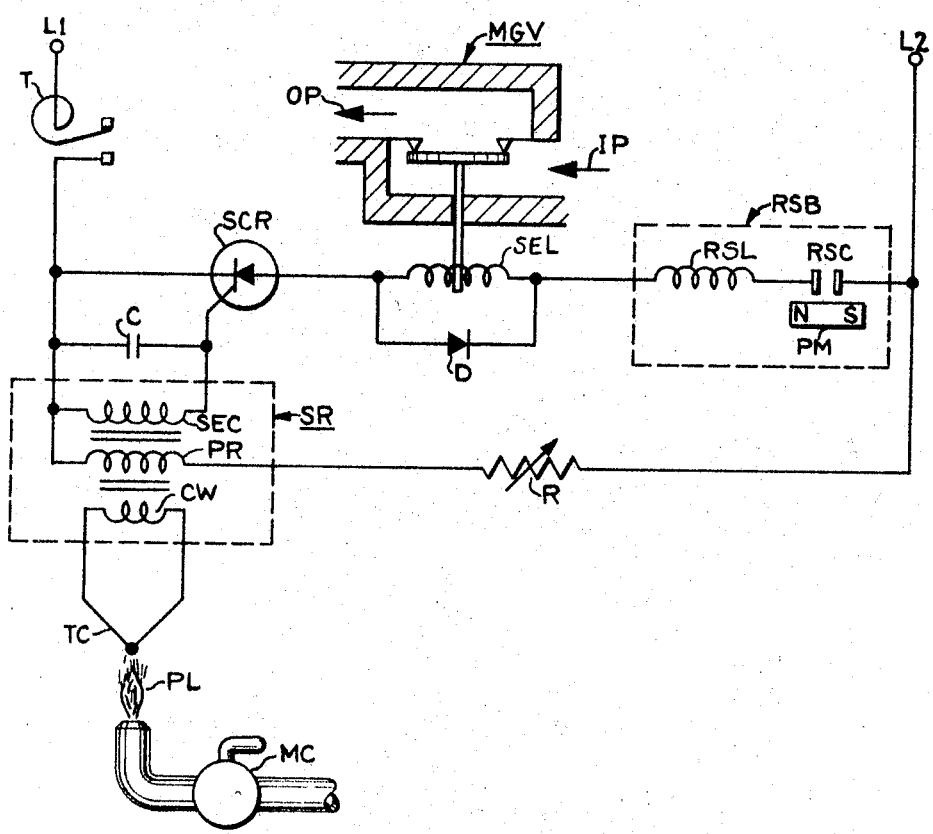

Russell B. Matthews, Goshen, Ind., assignor to Penn Controls, Inc., Oak Brook, Ill.
Filed Dec. 1, 1967, Ser. No. 687,216
Int. Cl. F23n 5/10; H01h 47/32
U.S. Cl. 431—25                    5 Claims

ABSTRACT OF THE DISCLOSURE

Fuel feeding means are energized through a silicon controlled rectifier which is selectively fired in response to a heated thermocouple. In the silicon controlled rectifier anode-cathode energizing circuit there is connected a pair of normally open reed switch contacts in series with an associated energizing coil. The reed switch contacts are actuated closed prior to the control being placed in operation and are then maintained in closed condition by a permanent magnet which is of insufficient strength to close the contacts by itself. The reed switch energizing coil is ineffective under normal operating conditions. However, under conditions where the silicon controlled rectifier becomes short circuited through its anode-cathode circuit, alternating current power flows through the reed switch contacts and energizing coil. The consequent alternating flux field of such coil overcomes the contact maintaining magnetic force of the permanent magnet, allowing the reed switch contacts to reopen and interrupt energization of the fuel feeding means. The combination of the reed switch, permanent magnet and energizing coil, thus, functions as a circuit breaker, upon detection of a shorted silicon controlled rectifier, to actuate the control to a safe condition.

---

The invention relates to fuel burner controls and more particularly to such controls in which the fuel feeding means is actuated by means of a silicon controlled rectifier.

In present day fuel burner controls utilizing silicon controlled rectifiers, it is desirable that the control "fails safe" under conditions of failure of the rectifier.

It is, therefore, an object of the invention to provide an improved control for fuel burners utilizing silicon controlled rectifiers, which control fails safe should the rectifier malfunction.

In carrying out the invention according to the preferred embodiment, fuel feeding means are energized through the anode-cathode circuit of a silicon controlled rectifier which is connectable across an alternating power source. The silicon controlled rectifier is selectively fired by a signal applied to its gate electrode, indicating a demand for energization of the fuel feeding means to feed fuel to a burner. Connected in series in the aforementioned anode-cathode circuit of the rectifier are normally open contacts of a reed switch. A permanent magnet is positioned to maintain the reed switch contacts closed provided that they are first actuated closed by other means. This is so, since the permanent magnet is selected of insufficient strength to actuate the reed switch contacts closed. An energizing coil is also connected in series with the reed switch contacts in the aforementioned anode-cathode circuit of the rectifier. With this arrangement, the reed switch contacts are actuated to closed condition initially before the fuel burner control is placed into operation. They are then maintained in such closed condition by the permanent magnet under normal operating conditions of the control.

The control functions to operate the fuel feeding means by applying half-wave rectification of the applied power through the anode-cathode circuit of the rectifier upon selective firing of the rectifier. Under conditions of a "short" between the anode-cathode electrodes of the rectifier, the unidirectional powered characteristic of the aforementioned series circuit is converted to an alternating powered one, causing alternating power to flow through the energizing coil of the reed switch. The consequent alternating flux field overcomes the permanent magnet flux field, allowing the reed switch contacts to return to their normally open condition. Opening of the contacts interrupts the energizing circuit of the fuel feeding means until the control is manually reset by closing of the reed switch contacts. Thus, the combination of the reed switch, energizing coil and permanent magnet functions as a circuit breaker which detects a shorted rectifier to cause the control to fail safe.

Features and advantages of the invention will be seen from the above, from the following description of the preferred embodiment when considered in conjunction with the drawing and from the appended claims.

In the drawing is shown a simplified schematic wiring diagram of a control for a fuel burner, which control, for convenience has been shown as utilizing gaseous fuel fed through a solenoid actuated gas valve, diagrammatically represented and designated MGV, and embodying the invention.

For convenience, in the preferred embodiment shown the control has been applied to a gas burner utilizing a standing pilot flame to heat a thermocouple, the pilot gas being fed through a manual cock in the gas line and the flame being lit manually. Also for convenience, the thermocouple has been shown as being connected through a saturable reactor SR to the gate electrode of the silicon controlled rectifier for causing firing of the rectifier, under conditions of a "hot" thermocouple. It is, nevertheless, to be understood that the invention is just as applicable to other systems, as, for example, to those in which the pilot flame is automatically relit each cycle of burner operation by means of auxiliary relay means shunted across the fuel feeding means circuit for providing fuel to the pilot and causing energization of an electric igniter in any convenient manner. The invention is also applicable to systems where the thermocouple is heated by other means than a pilot flame, as for example, by direct electric spark when the thermocouple acts as one of the electrodes of the igniter. In addition, the fuel demand need not be thermostatically controlled, as shown, but rather may be through a manually actuated switch.

With reference to the drawing, alternating power from any convenient source (not shown) is applied to the circuitry over supply lines L1, L2. T designates a thermostat of the snap-acting bimetallic type located in a space being heated by the burner (not shown). Thermostat T responds to ambient temperature changes in such heated space to indicate demand for heat to be supplied by the burner (not shown). A gas valve, generally designated MGV, is illustrated diagrammatically with directional arrows indicating the flow of gas from inlet port IP to outlet port OP of the valve. Valve MGV is of the solenoid operated type, the solenoid coil being designated SEL and connected in the anode-cathode circuit of silicon controlled rectifier SCR. When coil SEL is energized sufficiently, valve MGV opens, permitting gas flow to the burner (not shown) for ignition thereat. It should be understood that the gas flow to the burner (not shown) is ignited by a standing pilot shown as a flame PL, which flame is manually lit initially. Pilot gas is fed through a manual gas cock MC. Upon de-energization of main valve solenoid SEL, valve MGV returns to its closed condition, shutting off gas supply to the main burner (not shown).

A free wheeling diode D shunts solenoid coil SEL to provide a discharge path for current induced therein upon collapse of the coil flux field. This maintains solenoid coil SEL energized sufficiently during alternate blocked half cycles of the applied power to prevent valve MGV from reclosing until the coil has remained deenergized a full cycle of applied power.

Connected in series with solenoid coil SEL and rectifier SCR are the normally open contacts RSC of a reed switch, generally designated RSB, and an energizing coil RSL. Also provided is a permanent magnet designated PM in position to maintain reed switch contacts RSC closed after they have been closed by other means. This combination of reed switch contacts RSC, coil RSL and permanent magnet PM, the latter two being both in position to magnetically influence contacts RSC, is shown enclosed in a broken line block designated RSB. This combination comprises a circuit breaker whose function will be explained hereinafter. Magnet PM is selected of a force sufficient to maintain contacts RSC closed, once they have been closed, but of insufficient force to close them by itself. Coil RSL in series with contacts RSC is selected such that when it is energized by alternating power it will counteract the force of permanent magnet PM sufficiently to allow contacts RSC to return to their normally open condition.

Silicon controlled rectifier SCR may be caused to fire by applying the necessary signal to its gate electrode in any one of various ways, including by a manual switch. However, the signal is shown as being applied via a flame detector switch which comprises a saturable reactor SR (indicated in broken line outline) for coupling the output of a thermocouple TC (positioned to be heated by pilot flame PL) to the gate-cathode circuit of rectifier SCR. Thermocouple TC is connected across the control winding CW of saturable reactor SR. The output, or secondary winding, of saturable reactor SR is designated SEC and is connected across the gate-cathode electrodes of rectifier SCR, while its primary winding PR is connected in series with an adjustable resistor R through thermostat T to supply lines L1 and L2. Shunting output winding SEC is a capacitor C which can be charged sufficiently, by the saturable reactor output to cause firing of silicon controlled rectifier SCR. The construction of the saturable reactor flame switch forms no part of the subject invention and is covered in greater detail in another presently copending application, filed concurrently herewith and assigned to the same assignee by the same inventor.

In operation, assume that alternating power is applied to the circuitry by the closing of the contacts of thermostat T. Under such conditions, since thermocouple TC is in cold condition, saturable reactor SR is insufficiently saturated to provide a firing signal to the gate electrode of rectifier SCR.

Next assume that manual cock MC is turned to allow fuel to flow to the pilot burner and such fuel is lit manually to provide a pilot flame PL in position to heat thermocouple TC. Next assume that thermocouple TC heats sufficiently to provide current flow in control winding CW sufficient to cause a saturation of reactor SR which allows the induction of a sufficient signal in its output winding SEC to provide a firing signal to the gate-cathode electrodes of rectifier SCR. However, since reed switch contacts RSC, under such conditions, are in their normally open condition, gas valve MGV of the fuel feeding means remains in unactuated condition.

Next assume that, as an initial condition of placing the subject control in operation, reed switch contacts RSC are actuated closed. For example, with thermocouple TC "hot" and therostat T closed an electrical "jumper" is placed across contacts RSC. This causes rectifier SCR to fire and conduct through its anode-cathode circuit, providing half-wave rectified power through gas valve solenoid SEL and reed switch energizing coil RSL. Such unidirectional energization of coil RSL causes the coil to generate a flux field which is additive to that of permanent magnet PM to provide sufficient magnetic force on contacts RSC to actuate them to closed condition. Reed switch contacts RSC once thus closed, are held closed by the force of permanent magnet PM. Alternately, contacts RSC may initially be actuated closed by an external magnet or manually.

The control then opens and closes gas valve MGV in response to thermostat T Rectifier SCR fires upon each demand for heat by thermostat T, causing energization of gas valve solenoid SEL and fuel to be fed to the burner (not shown) to supply heat to the space being heated.

Next assume that silicon controlled rectifier SCR inadvertently becomes shorted through its anode-cathode circuit. Under such conditions, its rectification function is ended, causing alternating power to flow (when thermostat T calls for heat) through valve solenoid SEL and energizing coil RSL of reed switch circuit breaker RSB. Such alternating power flow through reed switch energizing coil RSL generates a fluctuating flux field of sufficient magnitude to overcome the flux field exerted on reed switch contacts RSC by permanent magnet PM. This causes reed switch contacts RSC to return to their normally open condition, in which condition they remain until the defective silicon controlled rectifier SCR is replaced by a maintenance man and reed switch contacts RSC are again placed initially in closed condition.

It may be seen from the foregoing that in the subject control the reed switch energizing coil and permanent magnet combination function as a shorted silicon controlled rectifier detector, actuating the control to de-energized condition of the gas valve.

As changes can be made in the above described construction and many apparently different embodiments of the invention can be made without departing from the scope thereof, it is intended that all matter contained in the above description or shown on the accompanying drawing be interpreted as illustrative only and not in a limiting sense.

What is claimed is:

1. A fuel burner control comprising,
fuel feeding means including an electrical operating coil, said means being operative when said coil is energized sufficiently for feeding fuel to a main fuel burner;
a silicon controlled rectifier having anode-cathode and gate electrodes,
the anode-cathode circuit of said rectifier being connected in series with said operating coil of said fuel feeding means for providing an energizing path therefor, under conditions where said rectifier conducts through its anode-cathode circuit;
reed switch means including normally open contacts and a permanent magnet mounted in position for maintaining said contacts closed, under conditions where they are first actuated closed by other means, said magnet being of insufficient strength to actuate said contacts to closed condition;
said reed switch means also including an energizing coil in series with its said contacts,
said energizing coil being effective when energized by unidirectional current for magnetically actuating said contacts to said closed condition and, when energized by alternating power of a magnitude exceeding a predetermined minimum amperage, overcoming said permanent magnet, contact closed maintaining force for actuating said reed switch contacts to open condition;
said reed switch means being connected with its said energizing coil and contacts in the anode-cathode circuit of said rectifier in series with said fuel feeding means energizing coil and an alternating power source, and
means operatively connected to the gate electrode of said silicon controlled rectifier and operative for firing said rectifier.

2. A control as set forth in claim 1 wherein there is also provided a pilot burner, and wherein said means for firing said silicon controlled rectifier comprise flame switch means responsive to the presence of flame at said pilot burner for causing firing of said silicon controlled rectifier.

3. A control as set forth in claim 1 wherein there is also provided a pilot burner, and wherein said rectifier firing means comprises, saturable reactor means having a primary winding energized by alternating power, a secondary winding, and a control winding, and thermocouple means positioned for heating at said pilot burner for generating a certain amount of current, said thermocouple means being connected across said control winding for generating a certain unidirectional current therein under conditions where said thermocouple is heated, and secondary winding of said saturable reactor being connected across the gate-cathode electrodes of said silicon controlled rectifier for causing firing of said rectifier under said heated thermocouple conditions.

4. A control as set forth in claim 3 wherein a capacitor is connected across said gate-cathode electrodes of said rectifier for accumulating sufficient charge from said saturable reactor means for firing said silicon controlled rectifier, and wherein said saturable reactor means is effective, under conditions where said thermocouple is heated for causing sufficient signal to be generated in its said secondary winding to cause firing of said rectifier through its anode-cathode circuit.

5. A control as set forth in claim 2 wherein said reed switch means before said control is made operative are placed in closed contact condition wherein they are then maintained by said permanent magnet, said reed switch means operating as a circuit breaker under conditions where said silicon controlled rectifier becomes short circuited through its anode-cathode circuit causing alternating current power to flow through said reed switch means energizing coil.

References Cited

UNITED STATES PATENTS

| | | | |
|---|---|---|---|
| 2,684,115 | 7/1954 | Cairns | 431—25 |
| 2,932,455 | 4/1960 | Ray | 317—156 X |
| 3,337,771 | 8/1967 | Weinger | 317—58 X |
| 3,384,439 | 5/1968 | Walbridge | 431—24 |

FREDERICK L. MATTESON, Jr., Primary Examiner

R. A. DUA, Assistant Examiner

U.S. Cl. X.R.

317—33, 58, 156, 148.5